United States Patent
Sahashi

(10) Patent No.: US 9,707,920 B2
(45) Date of Patent: Jul. 18, 2017

(54) CONVEYANCE SEAT

(71) Applicant: TOYOTA BOSHOKU KABUSHIKI KAISHA, Aichi-ken (JP)

(72) Inventor: Hideo Sahashi, Komaki (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 14/523,141

(22) Filed: Oct. 24, 2014

(65) Prior Publication Data
US 2015/0115578 A1 Apr. 30, 2015

(30) Foreign Application Priority Data

Oct. 30, 2013 (JP) ................................ 2013-225250

(51) Int. Cl.
| | |
|---|---|
| *B60R 21/2165* | (2011.01) |
| *B60N 2/427* | (2006.01) |
| *B60N 2/70* | (2006.01) |
| *B60R 21/231* | (2011.01) |
| *B60R 21/207* | (2006.01) |
| *B60R 21/215* | (2011.01) |
| *B60N 2/58* | (2006.01) |

(52) U.S. Cl.
CPC .......... *B60R 21/2165* (2013.01); *B60N 2/427* (2013.01); *B60N 2/70* (2013.01); *B60R 21/207* (2013.01); *B60R 21/215* (2013.01); *B60R 21/23138* (2013.01); *B60N 2002/5808* (2013.01); *B60R 2021/23146* (2013.01)

(58) Field of Classification Search
CPC ... B60R 21/22; B60R 21/2165; B60R 21/215; B60R 21/207; B60R 21/23138; B60R 2021/23146; B60N 2/427; B60N 2/70; B60N 2002/5808

USPC ........................................................ 280/728.3
See application file for complete search history.

(56) References Cited

U.S. PATENT DOCUMENTS

| | | | | |
|---|---|---|---|---|
| 5,826,938 A | * | 10/1998 | Yanase .................. | B60R 21/207 280/728.3 |
| 6,050,636 A | * | 4/2000 | Chevallier ........... | B60N 2/5825 280/728.1 |
| 6,457,741 B2 | * | 10/2002 | Seki ...................... | B60R 21/207 280/730.2 |

(Continued)

FOREIGN PATENT DOCUMENTS

| | | |
|---|---|---|
| CN | 1810549 | 8/2006 |
| CN | 102009607 | 4/2011 |

(Continued)

OTHER PUBLICATIONS

Yokoyama, A, JP 2005-022440 English Machine Translation.*
German Official Action with English translation for DE 10 2014 221 477.7 dated Jun. 29, 2015.

*Primary Examiner* — Karen Beck
(74) *Attorney, Agent, or Firm* — Greenblum & Bernstein, P.L.C.

(57) ABSTRACT

A conveyance seat has a cushion body, at least a portion of which is formed using foam material, and an airbag apparatus having an airbag that is deployed according to a predetermined condition. At least a portion of the airbag apparatus is covered by the cushion body. A door portion is formed on the cushion body, and an opening through which the airbag is able to pass is formed, without tearing the cushion body, by the door portion opening.

6 Claims, 6 Drawing Sheets

(56) References Cited

U.S. PATENT DOCUMENTS

| | | | | |
|---|---|---|---|---|
| 7,290,791 B2* | 11/2007 | Tracht | ................... | B60R 21/207 280/728.3 |
| 7,290,793 B2* | 11/2007 | Tracht | ................... | B60R 21/207 280/728.3 |
| 8,113,539 B2* | 2/2012 | Paruszkiewicz | ......... | B60N 2/58 280/728.3 |
| 8,562,017 B2 | 10/2013 | Oga et al. | | |
| 8,789,846 B2* | 7/2014 | Wipasuramonton | .. | B60R 21/232 280/730.2 |
| 8,833,852 B2* | 9/2014 | Festag | ................... | B60R 21/207 280/728.3 |
| 9,067,559 B2* | 6/2015 | Nii | ........................ | B60R 21/207 |
| 9,505,373 B2* | 11/2016 | Moon | ................... | B60R 21/232 |
| 2006/0113761 A1* | 6/2006 | Tracht | ................... | B60R 21/207 280/730.2 |
| 2006/0113768 A1* | 6/2006 | Tracht | ................... | B60R 21/207 280/730.2 |
| 2011/0057426 A1* | 3/2011 | Nakamura | .......... | B60R 21/2176 280/730.2 |
| 2011/0057487 A1 | 3/2011 | Suzuki | | |
| 2015/0251623 A1* | 9/2015 | Fujiwara | ............... | B60R 21/207 280/728.2 |
| 2016/0009239 A1* | 1/2016 | Wipasuramonton | .. | B60R 21/215 280/728.2 |
| 2016/0031404 A1* | 2/2016 | Takedomi | ........... | B60R 21/2334 280/729 |
| 2016/0114751 A1* | 4/2016 | Saito | ................... | B60R 21/2176 297/216.13 |

FOREIGN PATENT DOCUMENTS

| | | | | |
|---|---|---|---|---|
| CN | 102015378 | 4/2011 | | |
| GB | 2397047 | 7/2004 | | |
| JP | 8-258661 | 10/1996 | | |
| JP | 9-76859 | 3/1997 | | |
| JP | 9-86327 | 3/1997 | | |
| JP | 2005-022440 | 1/2005 | | |
| JP | 2007-126029 | 5/2007 | | |
| JP | 2015-101297 | * 11/2013 | ........... | B60R 21/207 |
| WO | 2010/131322 | 11/2010 | | |

* cited by examiner

CONVEYANCE SEAT

INCORPORATION BY REFERENCE

The disclosure of Japanese Patent Application No. 2013-225250 filed on Oct. 30, 2013 including the specification, drawings and abstract is incorporated herein by reference in its entirety.

BACKGROUND OF THE INVENTION

1. Field of the Invention

The invention relates to a conveyance seat. More particularly, the invention relates to a conveyance seat provided with an airbag apparatus.

2. Description of Related Art

An airbag apparatus has been provided in a conveyance seat in the past. An airbag apparatus serves to protect an occupant when an impact load is applied to the conveyance, and protects the occupant with an airbag provided in the airbag apparatus, which inflates and deploys when necessary. The airbag apparatus is normally partially covered by a seat pad that is a cushion body. When the airbag inflates, it bursts out of the conveyance seat while tearing the seat pad or the like around the airbag apparatus. Various innovations have been made so that the seat pad will tear easily at a specific position in order to enable the airbag to function properly. More specifically, Japanese Patent Application Publication No. 9-86327 (JP 9-86327 A) describes technology in which a cutout portion is provided in a portion of a seat pad.

However, there is still room for improvement with the technology described in JP 9-86327 A. Despite the need for the airbag to deploy rapidly and properly, with a conveyance seat employing the technology described in JP 9-86327 A, the seat pad has to be torn for the airbag to function properly. Therefore, it may take extra time and energy to tear the seat pad.

SUMMARY OF THE INVENTION

The invention thus provides a conveyance seat provided with an airbag apparatus, at least a portion of which is covered by a cushion body, which is configured such that an airbag is able to deploy rapidly.

One aspect of the invention relates to a conveyance seat including a cushion body, at least a portion of which is formed using foam material, and an airbag apparatus having an airbag that is deployed according to a predetermined condition, at least a portion of the airbag apparatus being covered by the cushion body. A door portion is formed on the cushion body, and an opening through which the airbag is able to pass is formed, without tearing the cushion body, by the door portion opening.

According to this aspect, neither the time nor the energy required to tear the cushion body when the airbag deploys is necessary. Also, the design of the conveyance seat is less affected by the outer shape of the airbag apparatus.

In the aspect described above, the door portion may be formed by a slit being provided in the cushion body.

According to this structure, the door portion is formed by a slit being provided in the cushion body, so the tactile impression of the door portion is able to be similar to that of the area around the door portion, and thus will not seem as odd to the user.

In the aspect described above, a direction in which a rotational axis of the door portion is positioned with respect to a center of the door portion when the door portion is closed may differ from a deployment direction of the airbag.

According to this structure, the direction in which the rotational axis of the door portion is positioned with respect to the center of the door portion when the door portion is closed differs from the deployment direction of the airbag, so the airbag is able to be deployed in a proper direction even if the door portion is not open all the way.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
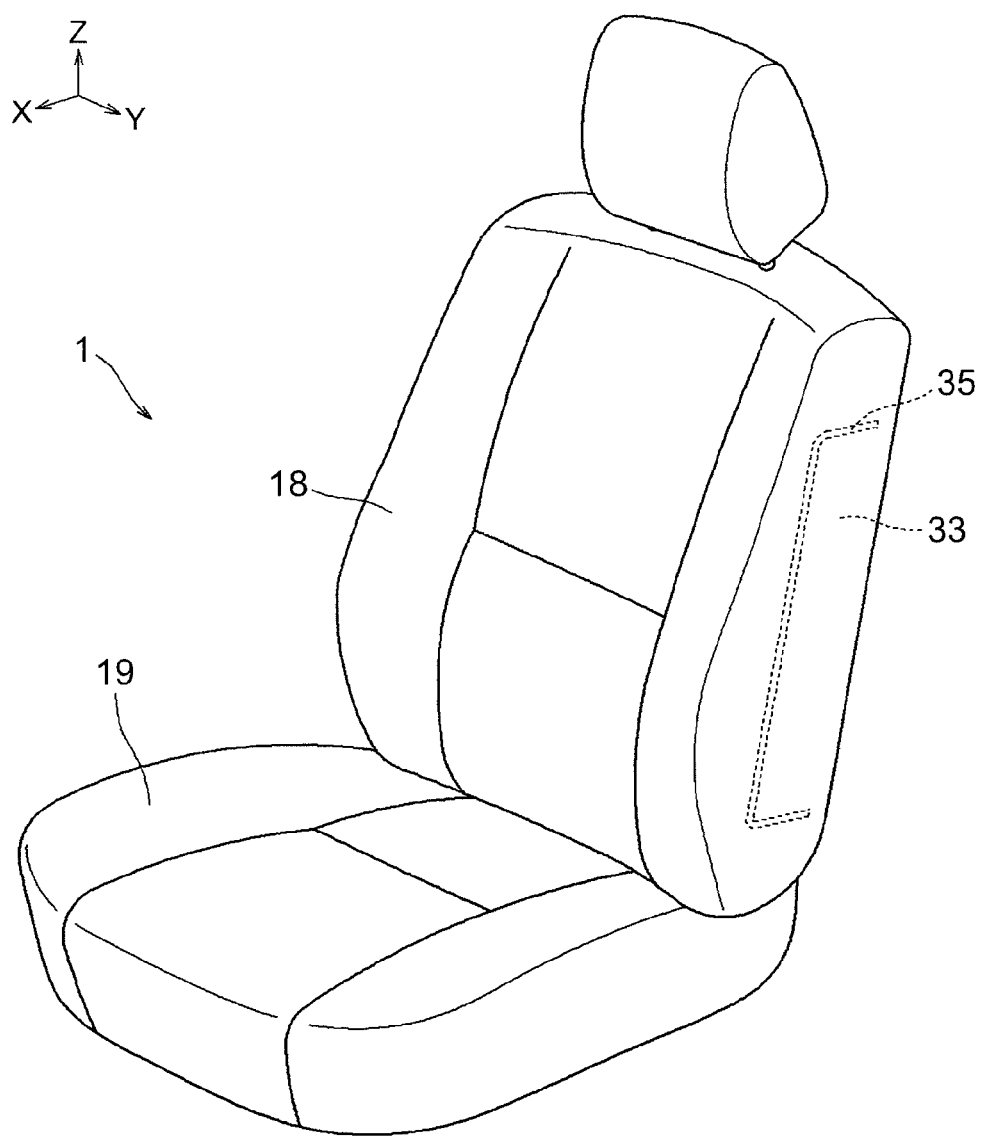
FIG. 1 is a perspective view of a conveyance seat.

Hereinafter, example embodiments of the invention will be described with reference to the accompanying drawings. Regarding directions such as a front-rear (longitudinal) direction, an up-down (vertical) direction, and a left-right (lateral) direction in this specification, X is designated as the forward direction, Y is designated as the left direction, and Z is designated as the upward direction, in FIG. 1 and the like. For example, normally that which is in the field of view when an occupant P is seated is forward, and the side behind the head, which is not in the field of view, is rearward. A conveyance seat 1 in this example embodiment is a vehicle seat that includes a seatback 18 that mainly opposes the back of the occupant P, and a seat cushion 19 that mainly opposes the thighs of the occupant P. A seat pad 31 and a seat cover 4 are provided covering a seat frame 2 that forms a frame. More specifically, the seat pad 31 that is placed over the seat frame 2 is fixed in place by being pushed against the seat frame 2 using the seat cover 4. Also, the seat pad 31 is formed using urethane foam that is typically used as foam material. The seat pad 31 is flexible yet able to maintain its shape, and has a rigidity that enables it to easily deform by force applied when an airbag 61 is deployed.

Figure 2:
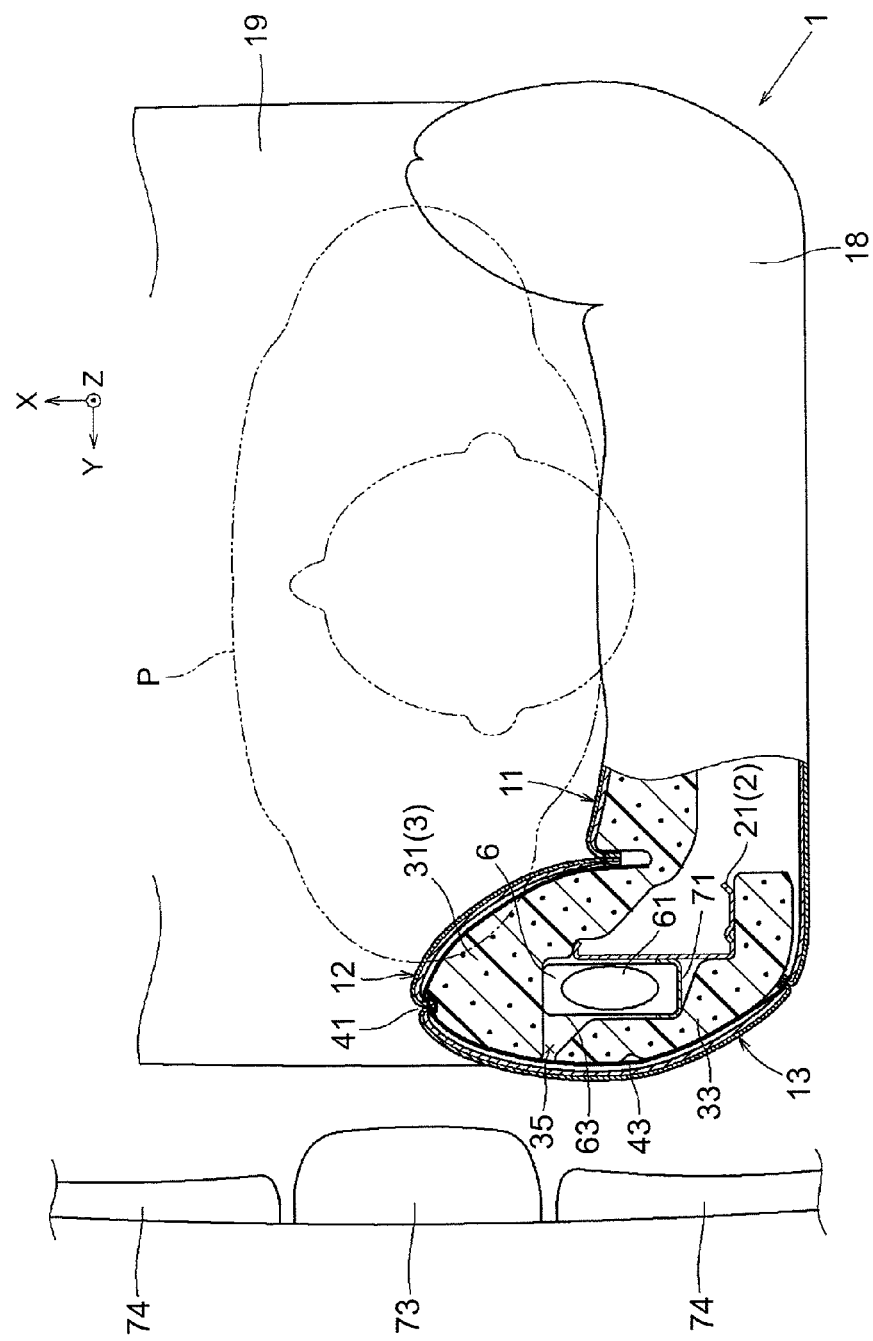
FIG. 2 is a view showing the relative positional relationship between the conveyance seat and a conveyance.
Figure 3:
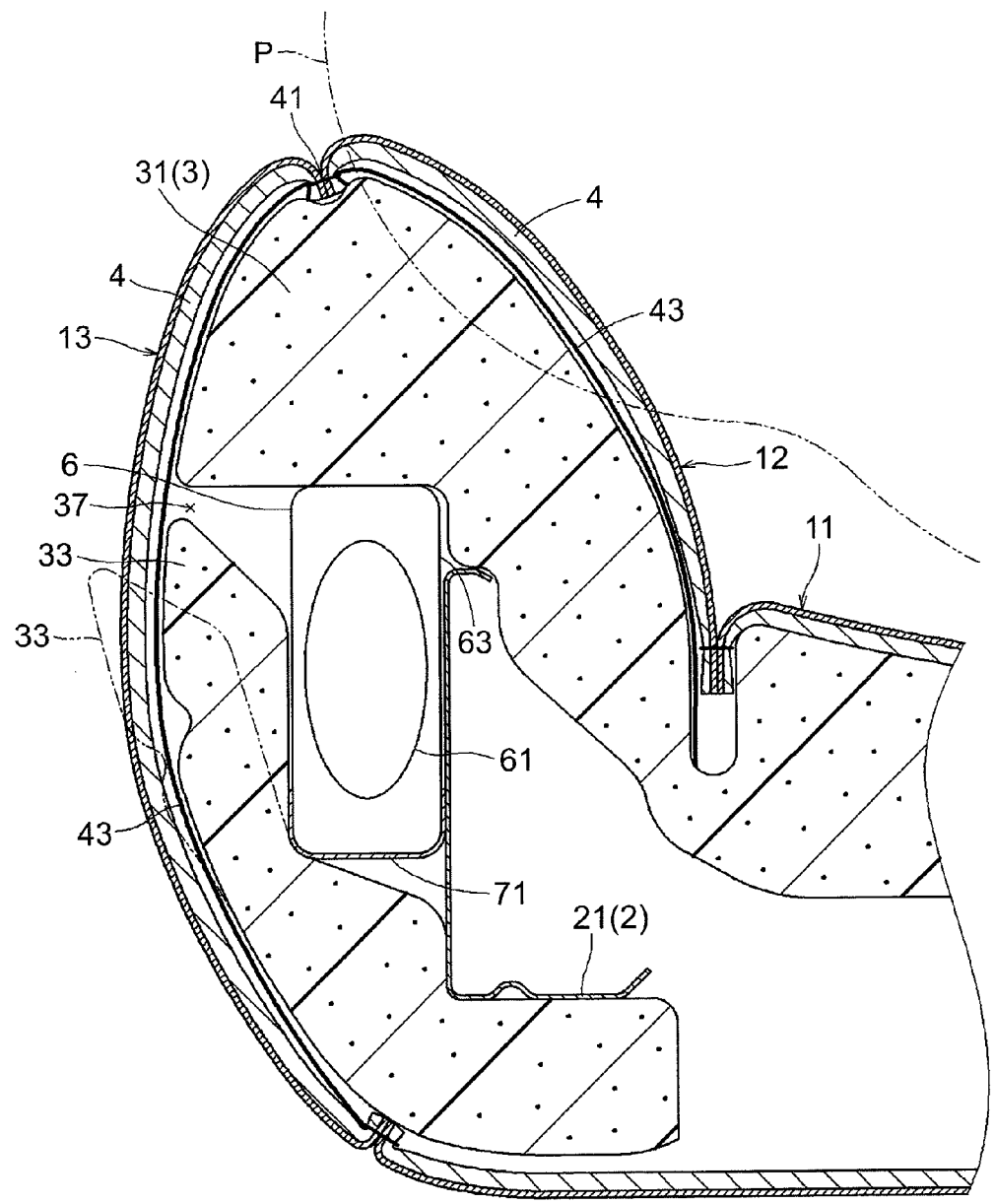
FIG. 3 is a partial enlarged view of the structure around an airbag apparatus of the conveyance seat.

Also, an airbag apparatus 6 is designed such that, in response to a predetermined load being applied to the conveyance or the like, a gas is introduced into the airbag 61 housed inside the airbag apparatus 6, and the airbag 61 that is inflated by this gas deploys outside of a housing 63 of the airbag apparatus 6. The airbag apparatus 6 is arranged covered by the seat frame 2 and the seat pad 31, as shown in FIGS. 2 and 3. The airbag 61 that inflates and deploys from the airbag apparatus 6 is configured to deploy toward the seat pad 31 side, without deploying toward the metal seat frame 2 side.

In this example embodiment, the airbag apparatus 6 is provided in a left side portion of the seatback 18. More specifically, the conveyance seat 1 is a configured such that the airbag apparatus 6 is fixed to a side frame 21 that is positioned on a side portion of a back frame that forms the frame of the seatback 18. Also, a reaction force plate 71 is arranged on a rear side of the airbag apparatus 6. This reaction force plate 71 helps the airbag 61 to deploy properly. The reaction force plate 71 in this example embodiment is a metal member with a generally C-shaped cross-section, such as a so-called channel member.

Also, the seatback 18 includes a substantially perpendicular planar main portion 11 that mainly supports a seated occupant, in a center position of the conveyance seat 1, a side portion 12 that is formed extending forward at an angle from both the left and right sides of the main portion 11, and a border portion 13 formed extending from the side portion 12 toward the rear. The seat pad 31 is formed making up these portions. The seat pad 31 serves as a cushion body 3 that mainly acts to elastically support a seated occupant. The seat pad 31 is arranged covering the back frame, the airbag apparatus 6, and the reaction force plate 71. In the seat pad 31, mainly the side portion 12 and the border portion 13 cover the airbag apparatus 6. When the airbag 61 deploys, it deploys in such a manner that force is applied mainly to the border portion 13. In particular, when the airbag 61 deploys, force that opens a door portion 33 provided in the border portion 13 is generated.

Also, the seat pad 31 is covered by the seat cover 4. The seat pad 31 is fixed in place by being sandwiched between the seat frame 2 and the seat cover 4, without being joined to the seat pad 31 and the seat cover 4. That is, force applied to the seat cover 4 is not easily absorbed by the seat pad 31, so even if force is applied locally to the seat cover 4, the applied force tends to be transmitted to a relatively wide area of the seat cover 4. Therefore, by moving the door portion 33 of the seat pad 31, which is able to open and close, toward the seat cover 4 side, force is transmitted from the door portion 33 to the seat cover 4, and the force that is transmitted to the seat cover 4 is able to be efficiently applied to a weak portion 41 of the seat cover 4.

Figure 4:
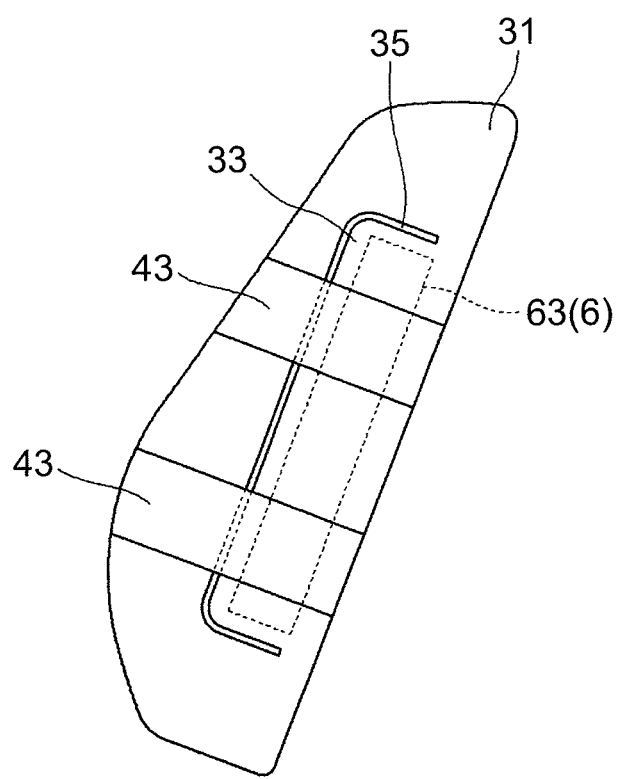
FIG. 4 is a view showing the positional relationship between a door portion and webbing.

More specifically, the weak portion 41 is provided on a front side of the border portion 13, in the seat cover 4 that covers the seat pad 31. The seat cover 4 is configured so as to be able to be torn with this weak portion 41 as the starting point. Also, the weak portion 41 is formed by sewing a slit provided in the seat cover 4 together. Webbing 43 as reinforcing material is arranged on the seat cover 4 all the way up to close to the weak portion 41, such that when the airbag 61 is deployed, force is applied to the webbing 43. This webbing 43 is a fabric body with no elasticity. Also, one end of the webbing 43 is fixed to the seat cover 4 in a position adjacent to the weak portion 41. Another end of the webbing 43 is fixed to the seat cover 4, and another end of the webbing 43 is fixed to the back frame in a position that is not shown. Therefore, force is able to be applied to the weak portion 41 of the seat cover 4 that is adjacent to one end of the webbing 43, by force from the airbag 61 being applied to the webbing 43. When this force becomes a predetermined amount, the seat cover 4 will tear starting at the weak portion 41. The webbing 43 does not cover the entire seat cover 4, but is instead provided on a portion opposite the airbag apparatus 6, as shown in FIG. 4.

In this example embodiment, the door portion 33 is provided on the flexible seat pad 31. The door portion 33 is formed by providing a slit 35 in the seat pad 31. The door portion 33 that has a generally rectangular parallelepiped shape is formed by providing this slit 35 is a general U-shape (see FIG. 4). The door portion 33 having a so-called hinged door configuration is formed by providing this U-shaped slit 35. With this configuration, a region that linearly connects areas near the end portions of the slit 35 together serves as a rotational axis of the door portion 33. This rotational axis is provided positioned on a rear side of the door portion 33. More specifically, the door portion 33 opens by being displaced from the position indicated by the solid line in FIG. 3 to the position indicated by the alternate long and short two dashes line in the same drawing. The door portion 33 is formed along a side surface of the airbag apparatus 6, and is formed slightly larger than the airbag apparatus 6 in the vertical direction, as shown in FIG. 4. Also, as shown in FIG. 3, the thickness of an end portion (a tip end portion) of the door portion 33 that is on the side opposite the rotational axis is formed thinner than the thickness of a portion of the door portion 33 that is on the rotational axis side of the door portion 33 so that it will not get in the way when the door portion 33 opens, even without increasing the width of the slit 35. However, in the drawings, the width of the slit 35 is shown large to facilitate understanding of the invention.

Figure 5:
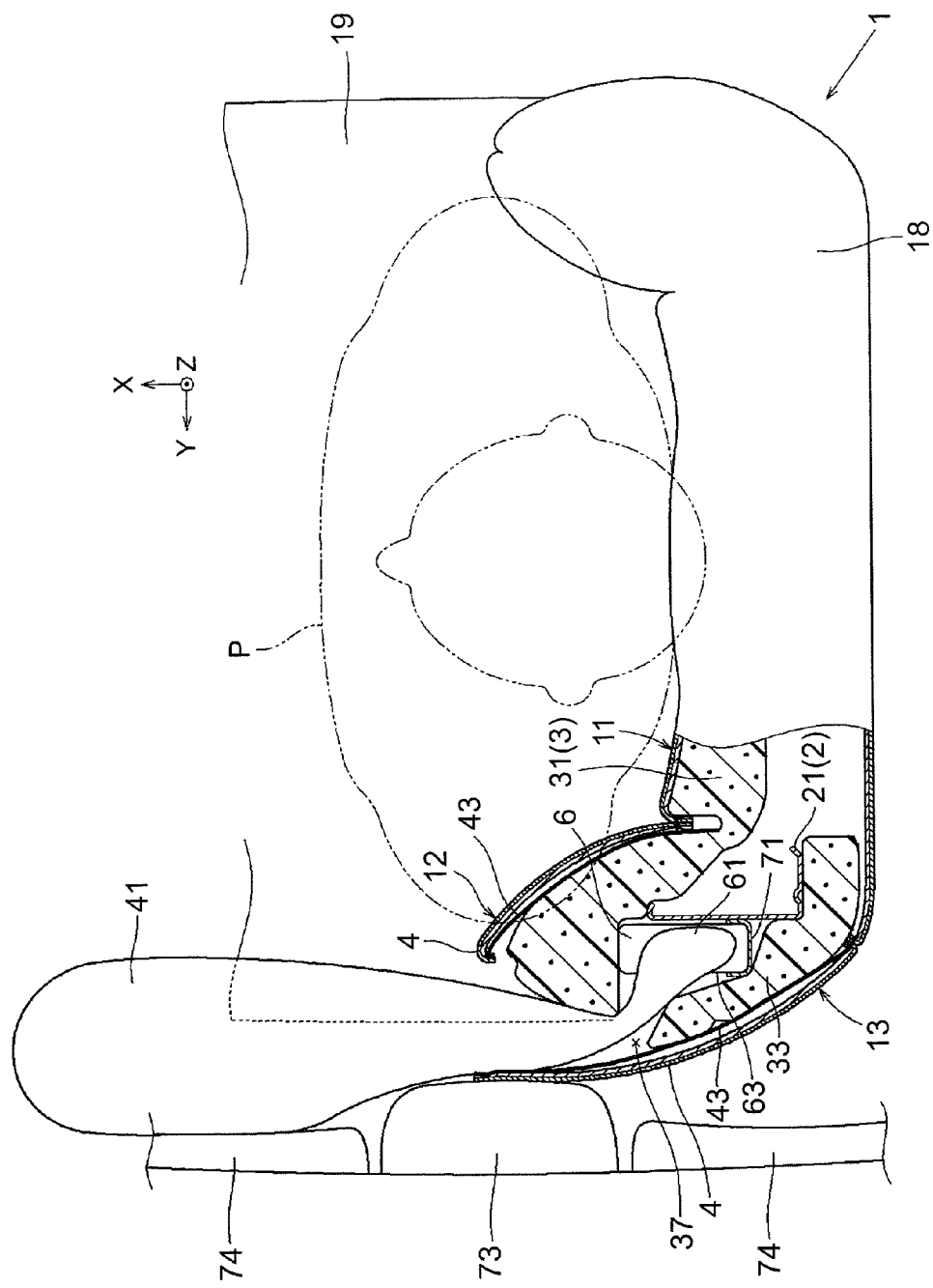
FIG. 5 is a view illustrating a state in which an airbag is deployed from the airbag apparatus provided in the conveyance seat.

Next, inflation and deployment of the airbag 61 from the airbag apparatus 6 of the conveyance seat 1 of the invention will be described. When a predetermined load is applied to a conveyance in which the conveyance seat 1 is arranged, gas is filled into the airbag 61 that is housed in the housing 63 of the airbag apparatus 6, such that the airbag 61 deploys. When the gas is introduced into the airbag 61, the airbag 61 deploys and force is applied to the door portion 33 such that the closed door portion 33 opens. When the door portion 33 is displaced so that it opens, an opening 37 through which the airbag 61 can pass through is formed. At this time, the seat pad 31 that is the cushion body 3 will not tear. Also, when the door portion 33 is displaced so that it opens, force is applied to the webbing 43 that is attached to the seat cover 4 adjacent to the door portion 33, and moreover, force is applied to the weak portion 41 of the seat cover 4. When a predetermined force is applied to the weak portion 41 of the seat cover 4, the weak portion 41 tears and the airbag 61 deploys out of the conveyance seat 1 from the torn location (see FIG. 5). At this time, the airbag 61 that has deployed out of the conveyance seat 1 deploys to the front side along a pillar 73 and a vehicle body door 74. The occupant P is first able to be protected by the airbag 61 deploying out of the conveyance seat 1.

With the conveyance seat 1 of this example embodiment, the airbag 61 is able to be rapidly deployed without the need to tear the seat pad 31 when the airbag 61 deploys. Also, when the airbag 61 pushes on the door portion 33 that is adjacent to the airbag 61, the door portion 33 then pushes on the webbing 43, so a force that acts to tear the seat cover 4 is generated at just about the same timing as when the airbag 61 starts to inflate. Therefore, the airbag 61 is able to be deployed relatively rapidly. Also, the airbag apparatus 6 is covered by the seat pad 31, so the seating surface and the like of the conveyance seat 1 is able to be shaped by the seat pad 31, and thus the degree of freedom in the design surface will not be severely impaired. Also, the front surface and the side surface of the conveyance seat 1 are covered by the seat pad 31, so normally the occupant P will not touch the airbag apparatus 6. Therefore, the seated occupant will not feel (or will feel less) that there is something odd when he or she touches the conveyance seat 1. Further, the door portion 33 of the seat pad 31 is provided on the border portion 13 of the seat pad 31, so the shape of the front side of the seat pad 31, such as the main portion 11 and the side portion 12 and the like is able to be determined freely. Also, the weak portion 41 of the seat cover 4 is configured to tear by force applied to the border portion 13 of the seat cover 4, so the position where the weak portion 41 of the seat cover 4 is provided is not limited to the front end of the border portion 13. Therefore, the degree of freedom in design of the seat cover 4 is able to be increased. Also, the door portion 33 is able to be formed simply by cutting a portion of the seat pad 31, so there is no need to add a new member. Further, the door portion 33 is able to be formed by a simple operation. Also, the vertical height of the door portion 33 is similar to the vertical height of the airbag apparatus 6, so the airbag 61 is able to smoothly move to the seat cover 4 side. Also, the rotational axis of the door portion 33 is in a position that is not in the deployment direction of the airbag 61, so the airbag 61 is able to deploy in a suitable direction even without the door portion 33 being fully open. More specifically, the rotational axis of the door portion 33 is positioned on the rear side of the airbag apparatus 6, so the airbag 61 is able to deploy smoothly toward the front. In other words, the tip end portion of the door portion 33 is forward of the rotational axis of the door portion 33, so it will not impede the deployment of the airbag. Also, the door portion 33 is covered by the seat cover 4, so the occupant P is unable to visually recognize the door portion 33 and the airbag apparatus 6, thus the external appearance of the conveyance seat 1 will not be lost. Also, the airbag 61 comes out from the seat pad 31 from the border portion 13, so a situation in which force from the airbag 61 is applied in a manner that pushes the occupant P away when the airbag 61 deploys is inhibited from occurring. In other words, the occupant P will not get in the way when the door portion 33 opens. That is, the door portion 33 will be able to open almost uniformly, regardless of the physical build and seating position of the occupant P. Also, the door portion 33 is provided on the border portion 13 side of the seat pad 31, so the thickness of the door portion 33 is able to be made relatively thin, which in turn makes it relatively easy for the door portion 33 to open.

Figure 6:
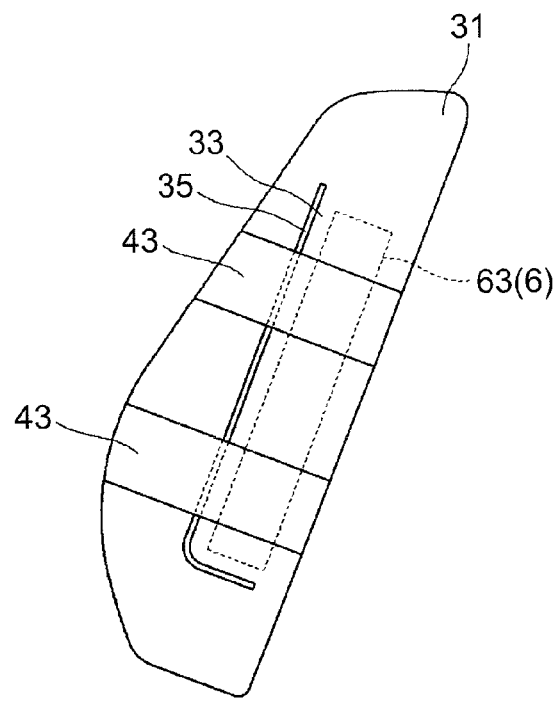
FIG. 6 is a view of an L-shaped slit provided in the conveyance seat.
Figure 7:
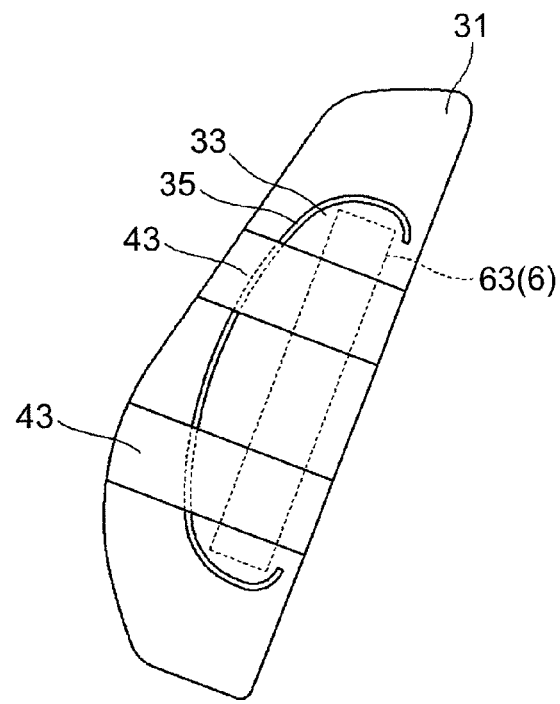
FIG. 7 is a view of a C-shaped slit provided in the conveyance seat.

Some specific modified examples aside from the example embodiment include a case in which the shape of the door portion 33 is a generally triangular prism shape by providing a generally L-shaped slit 35 in the seat pad 31 as shown in FIG. 6, and a case in which the shape of the door portion 33 is a generally circular cylindrical shape by providing a generally C-shaped slit 35 as shown in FIG. 7. In particular, with the L-shaped slit 35, the amount of the slit 35 is able to be reduced overall, so the effects of the invention are able to be obtained while inhibiting a decrease in the rigidity of the seat pad 31. Also, the shape of the slit 35 is not limited to those described above, and may be another shape as long as it fulfills the object of the invention.

Above, the invention has been described using one example embodiment and two modified examples, but the invention may also be carried out in various modes other than those described above. Also, it is not necessary to provide the slit by cutting the seat pad. For example, when a slit is provided, the slit may already be provided at the time of molding, such as foam molding. Also, the cushion body provided with the door portion does not need to be formed as a seat pad made of foam material. For example, a door member provided with a frame body and a door portion may be prepared as a separate member, and this door member may be integrally formed so as to be integrated with foam material. Also, the door portion is not limited to just a single door shape. For example, the door portion may also have a double door shape. In this case, the door portion is preferably provided such that a length direction of the rotational axis thereof is in the front-rear direction. With this mode, two rotational axes are positioned in the vertical direction with respect to the center of the door portion when it is closed, which is different than the deployment direction (i.e., forward) of the airbag, so the airbag is still able to deploy in the proper direction even without the door portion being fully open. Also, the foam material used in the conveyance seat does not have to be urethane foam. Other well-known foam material may also be used. Further, the back material that protects the surface of the seat pad may be provided on the surface on the side contacting the seat frame. Also, the door portion may be provided not only on the seatback, but also on the seat cushion or the like. In this case, the airbag will deploy from the seat cushion or the like. Also, the door portion is not limited to being provided on the border portion. For example, the door portion may also be provided on the side portion or the main portion. Further, the conveyance is not limited to a vehicle, but may also be a conveyance that flies through the air (i.e., an aircraft) such as an airplane or a helicopter, or a conveyance that travels on or under water such as a marine vessel or a submersible.

What is claimed is:
1. A conveyance seat comprising:
   a cushion body, at least a portion of which includes a foam material, the cushion body includes a border portion and a side portion;
   a seat cover that covers the cushion body, the seat cover including a weak portion that defines a boundary between the side portion and the border portion of the cushion body; and
   an airbag apparatus having an airbag that is deployed from within the airbag apparatus according to a predetermined condition, at least a portion of the airbag apparatus is covered by the cushion body, wherein
   the foam material of the cushion body includes a door portion defined by a slit provided in the border portion of the cushion body,
   the door portion is configured to open such that the airbag is able to pass through the slit in the cushion body without tearing the cushion body,
   the slit extends along the border portion in a vertical direction of the conveyance seat and in a front-rear direction of the conveyance seat,
   the border portion extends from the side portion of the cushion body rearward in the front-rear direction of the conveyance seat,
   a front portion of the foam material of the cushion body extends continuously from the side portion, across a front face of the airbag apparatus, across the weak portion of the seat cover and to a first edge of the slit of the border portion so as to cover the airbag apparatus,
   the seat cover is configured to tear at the weak portion before other portions of the seat cover,
   the weak portion of the seat cover is spaced from the first edge of the slit and covers the front portion of the foam material,
   the door portion extends from a second edge of the slit, which opposes the first edge of the slit, and along a side face of the airbag apparatus, and
   when the airbag is disposed within the airbag apparatus, an opening is provided between the first edge of the slit and the second edge of the slit.
2. The conveyance seat according to claim 1, wherein
   a direction in which a rotational axis of the door portion is positioned with respect to a center of the door portion when the door portion is closed differs from a deployment direction of the airbag.

3. The conveyance seat according to claim 2, wherein a tip end portion of the door portion is positioned forward of the rotational axis of the door portion.

4. The conveyance seat according to claim 1, wherein a thickness of a tip end portion of the door portion is thinner than a thickness of a portion of the door portion that is on a rotational axis side of the door portion.

5. The conveyance seat according to claim 1, wherein the cushion body further includes a main portion in a center portion of the conveyance seat and the side portion extends from the main portion angularly forward in the front-rear direction of the conveyance seat.

6. The conveyance seat according to claim 1, wherein the opening provided between the first edge of the slit and the second edge of the slit when the airbag is disposed within the airbag apparatus extends within an area defined, in part, by the seat cover, the first edge of the slit, the second edge of the slit, and the side face of the airbag apparatus.

* * * * *